A. D. BURNETT.
CALCULATING DEVICE.
APPLICATION FILED AUG. 17, 1908.
948,966.
Patented Feb. 8, 1910.
2 SHEETS—SHEET 1.
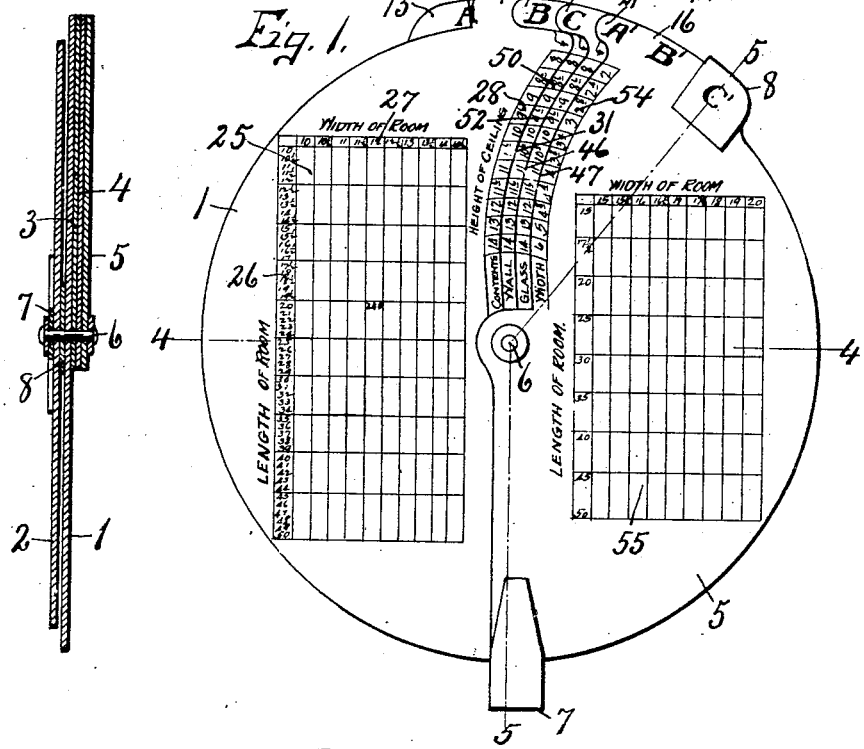
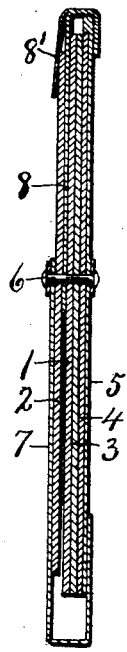
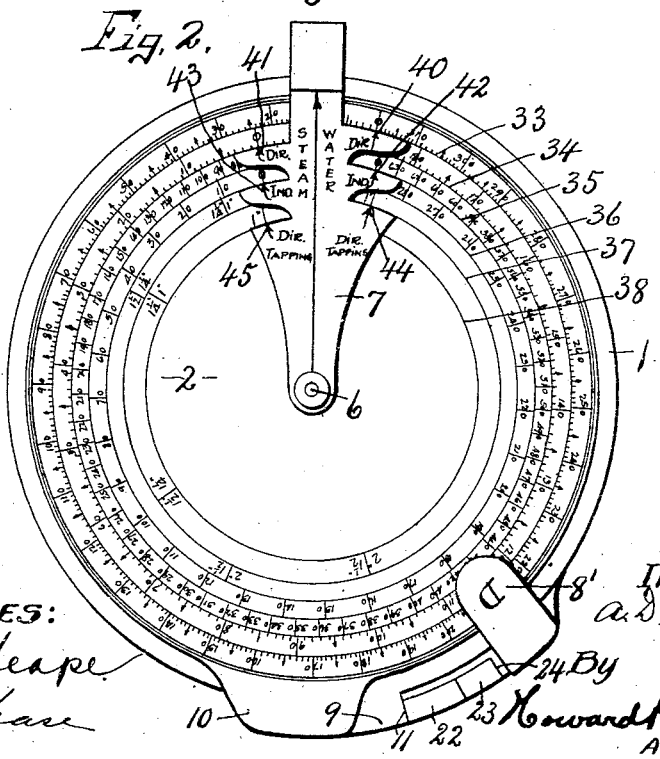
WITNESSES:
A. W. Heape
H. E. Chase
INVENTOR.
A. D. Burnett
By Howard P. Denison
ATTORNEY.

A. D. BURNETT.
CALCULATING DEVICE.
APPLICATION FILED AUG. 17, 1908.
948,966.
Patented Feb. 8, 1910.
2 SHEETS—SHEET 2.
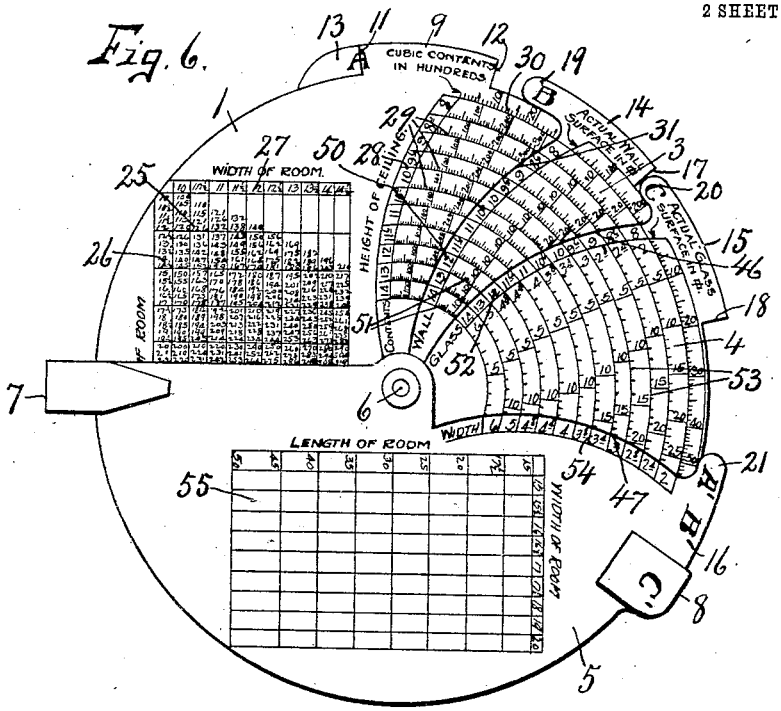
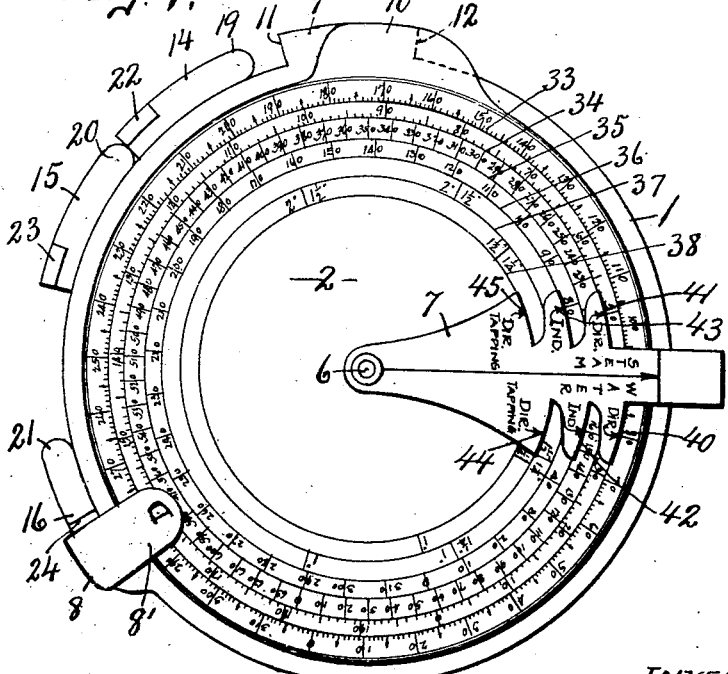
WITNESSES.
A. W. Heape
H. E. Chase
INVENTOR.
A. D. Burnett
By Howard P. Denison
ATTORNEY.

UNITED STATES PATENT OFFICE.

ARTHUR D. BURNETT, OF NEW YORK, N. Y., ASSIGNOR TO PIERCE, BUTLER & PIERCE MANUFACTURING COMPANY, OF SYRACUSE, NEW YORK, A CORPORATION OF NEW YORK.

CALCULATING DEVICE.

948,966.  Specification of Letters Patent.  Patented Feb. 8, 1910.

Application filed August 17, 1908. Serial No. 448,996.

*To all whom it may concern:*

Be it known that I, ARTHUR D. BURNETT, of New York, in the county of New York, in the State of New York, have invented new and useful Improvements in Calculating Devices, of which the following, taken in connection with the accompanying drawings, is a full, clear, and exact description.

This invention relates to certain improvements in calculating devices involving the use of a plurality of coaxial superposed plates or disks rotatable relatively to each other and upon which is printed or otherwise impressed a tabulated system or systems of correlated numerals representing the factors or aliquot parts and multiples of certain numerical computations, so that by manipulating the disks according to a preëstablished rule, the numerical result sought is visibly and accurately indicated on one of the disks.

The broad object is to produce a simple, compact and comparatively inexpensive device whereby any numerical result involving the use of factors and multiples in more or less complex computations may be easily, quickly and accurately obtained.

Another object is to enable the same device to be used in extending the calculations and at the same time to accurately indicate the total result of such extended calculations.

A further object is to cause the device to indicate different numerical results by the same adjustment for the same or for different purposes.

The particular object, however, of my present invention is to enable any person skilled or unskilled to easily and quickly determine the amount of radiating surface in square feet required to properly heat a room or rooms of given dimensions under various conditions of exposure and with different heating systems such as steam or hot water and direct or indirect radiation.

Other objects and uses relating to specific parts of the device will be brought out in the following description.

In the drawings—Figures 1 and 2 are respectively obverse and reverse views of a calculating device embodying the various features of my invention, the disks being shown in their normal or starting positions with the indicators at zero. Fig. 3 is an edge view of the device seen in Fig. 1. Figs. 4 and 5 are sectional views taken respectively on lines 4—4 and 5—5, Fig. 1; Fig. 4 being shown in an upright position although taken on a horizontal line. Figs. 6 and 7 are respectively obverse and reverse face views of the same device adjusted to indicate the number of square feet of radiation required for a room of given size with a predetermined area in square feet of door and window openings.

This calculating device preferably comprises a main body disk —1—, a counter-disk —2— and one or more, in this instance three, segmental disks —3—, —4— and —5— all of which are made of card board or similar thin and comparatively inexpensive material superposed in close juxtaposition and pivoted together at the center by a pivotal pin or eyelet —6— whereby they may be rotated relatively to each other about a common axis.

A radial indicator arm —7— lying in close juxtaposition to the back or reverse side of the disk —2— has one end pivoted upon the pin —6— and, therefore, coaxial with said disks and its other end extended some distance beyond and transversely around the edges of the disk and is adhesively or otherwise secured to the front or obverse face of the outer segment —5— so as to cause the indicator arm —7— to travel around the reverse face of the segment —2— as said segment is rotated. A similar radial arm —8— is interposed between the disks —1— and —2— and pivoted at one end upon the pivotal pin —6— while its other end extends some distance beyond and transversely around the edges of the disks —1—, —3—, —4— and —5— and is adhesively or otherwise secured to the obverse face of the segment —5— and is provided with a finger clamp or flap —8'— lapping upon the reverse faces of the outer edges of the disks —1— and —2— to enable certain disks to be held between the fingers while other disks may be rotated for a purpose hereinafter described.

The disks —1— and —2— are substantially circular in general outline but are provided with comparatively short radial extensions —9— and —10— as best seen in Figs. 6 and 7, the extension —9— being comparatively short circumferentially and provided with radial end edges forming abutments —11— and —12—. The radial extension —10— of the disk —2— is provided with a laterally projecting shoulder —13— forming an abutment projecting over the edge of the disk —1— and adapted to engage with the abutment —11— to limit the movement of the disk —2— in one direction and also to determine the zero or starting position of said disk —2— which is free to move in the opposite direction or to the left of Figs. 1 and 6. The segments —3—, —4— and —5— are provided with similar radial extensions —14—, —15— and —16— which are comparatively short circumferentially, the extensions —14— and —15— terminating at corresponding ends in abutments —17— and —18— respectively similar to the abutment —12— while the opposite ends of the extensions —14—, —15— and —16— extend some distance beyond the adjacent radial edges of their corresponding segments forming thumb pieces —19—, —20— and —21— which are adapted to ride by and lap upon the adjacent ends of the extensions —9—, —14— and —15— when the segments are in their normal or starting positions. These starting or zero positions of the segments —3—, —4— and —5— are determined by laterally projecting stops —22—, —23— and —24— formed respectively upon the extensions —14—, —15— and —16— and serving to limit the movement of said segments in one direction or to the left of Figs. 1 and 6, said limiting stops —22—, —23— and —24— being clearly shown in Fig. 7. It is now clear that the counter disk —2— is movable from its starting position to the left of Figs. 1 and 6 relatively to the main body or disk —1— while the segments —3—, —4— and —5— are similarly rotatable to the right of said figures with reference to the disks —1— and —2—, the purpose of which will be hereinafter made apparent.

As previously stated this device is specifically adapted for computing the amount of radiating surface required to properly heat the room or rooms of a building to the desired temperature under certain conditions of exposure and with different heating systems such as steam or hot water and direct or indirect radiation although it is clearly evident that the same device may be used in other computations where certain combinations of numerical factors or aliquot parts produce certain numerical results. In the present instance the obverse side or face of the main body or disk —1— is provided with a table —25— of numerals representing the floor areas of rooms of various lengths and widths which are printed or otherwise impressed in vertical and horizontal head columns —26— and —27— as best seen in Figs. 1 and 6, the numbers in the head columns being arranged in sequence and representing the linear measurement of the length and width of the room in feet and factors of the succeeding numerals at the intersection of the head columns.

The table —25— is printed or otherwise impressed on practically one-half of the disk —1— and upon the opposite half of the obverse side is printed or otherwise impressed a substantially radial head column —28— of numerals and a series of concentric rows —29— and —30— of numbered graduations, the concentric rows —29— of numbered graduations corresponding with the head numerals in the column —8— from which they are numbered consecutively to correspond with the numbers in the table —25— indicating the square feet of floor space while the outer row —30— of graduations are numbered in hundreds and indicate the cubical contents of rooms of different dimensions as taken from the numbers in the head columns —26—, and —27— of the table —25— and also from the numbers in the head column —28—, that is the numbers in the concentric row —30— represent the products of the three dimensions of the room or the product of any one of the multiples in the table —25— multiplied by the third dimension or height of the ceiling as found in the radial column —28—.

The amount of radiation required to heat a room is based primarily upon the cubical contents of such room and in certain climates or altitudes, the amount of radiating surface required to heat a room of given dimensions under similar conditions of exposure is always the same and, therefore, having given the cubical contents of the room, the amount of radiating surface required to heat the same may be readily computed.

The object of this invention is to enable any one skilled or unskilled in the art to accurately and expeditiously determine the relative radiation surface required for a room of given dimensions or cubical contents and for this purpose, the reverse or back side of the disk —2— is provided with a series of in this instance, six, concentric rows —33—, —34—, —35—, —36—, —37— and —38— of graduations which are numbered consecutively or in sequence from a predetermined or zero point, those of each row representing the radiating surface in square feet for different heating systems as will be hereinafter pointed out.

When the segment —3— is in its normal or starting position, it practically conceals all of the concentric rows —29— and —30— of graduations. One of its radial edges as —31— extending from the center toward the circumference lies along and in close proximity to the head column —28— of the disk —1— leaving the latter column exposed, said edge —31— forming an indicator movable along the concentric graduations as the segment —3— is rotated from left to right from its starting position, by which rotation, the segments —4— and —5— are similarly rotated thereby moving the indicator arm —7— around the concentric graduations of the counter disk —2— through a similar arc, said arm —7— being provided with a series of in this instance six, index fingers —40—, —41—, —42—, —43—, —44— and —45— corresponding to and registering with the concentric graduations —33—, —34—, —35—, —36—, —37— and —38—. In like manner the segments —4— and —5— are provided with substantially radial indicating edges —46— and —47— running parallel with the indicating edge —31— of the segment —3— and also with the head column —28— of numerals of the disk —1—, said indicating edges being, in this instance, curved slightly from a radial line so as to bring the numerals in the concentric rows slightly out of radial alinement with each other to avoid confusion and to permit them to be more easily read or rather to permit the edges of the segments to be registered with any individual graduation of any one of the concentric rows without confusing it with the corresponding numeral in another row as would be the case if the indicating edges and numbers on the concentric rows were exactly radial.

The segment —3— is provided along its indicating edge with a head column —50— of numerals and a series of concentric rows —51— of numbered graduations, the numerals in the head column —50— and those in the concentric rows indicating two dimensions of an exposed wall, which it may be desired to include in the computation for obtaining the amount of radiating surface required to heat the room. In like manner the segment —4— is provided along its indicating edge with a column —52— of numerals and is also provided with concentric rows —53— of numbered graduations representing the dimensions of glass surface as additional exposure which must enter into the same computation, the segment —5— being also provided along its edge with a column —54— of numerals also representing the width of glass, said segment having printed or otherwise impressed thereon a table —55— constituting an extension on the table —28— on the disk —1—.

In operation, assuming that it is desired to ascertain the number of square feet of radiating surface required to properly heat a room in which the floor space is 12 ft. by 20 ft. and the height of the ceiling is 10 ft. and that one of the walls of the room 10 ft. by 20 ft. is exposed, that is an outside wall, and that there are three windows or glass areas, each 3 ft. by 6 ft., then by grasping the extensions —9— and —13— at —A— between the thumb and fore finger of the left hand so as to hold the disks —1— and —2— from relative movement and similarly grasping the extensions —14—, —15— and —16— at —A'— between the thumb and fore finger of the right hand, the segments —3—, —4— and —5— may be rotated to the right relatively to the segments —1— and —2— until the indicating edge —31— of the segment —3— is brought into registration with the numbered graduation 240 after the heading —10— indicating the height of the ceiling, the number 240 indicating the area of the room having the floor space 10 ft. by 20 ft. as taken from the table —25— in which position it will be observed that the outer end of the indicating edge —31— is nearly in registration with the graduation —24— indicating the cubical contents in hundreds of the room. This partial rotation of the segments —3—, —4— and —5— imparts similar movement of the indicator —7— and its index fingers around concentric graduations on the reverse side of the disk —2— and if the room had no exposed wall or glass surface this adjustment would be sufficient and the indicating fingers on the arm —7— would indicate on their respective graduations the amount of radiating surface for different heating systems indicated thereon but inasmuch as there is an exposed wall surface and window surface to be brought into the computation, further adjustment is necessary. This further adjustment for bringing the wall surface into the computation is effected by shifting the position of the left hand to the point —B— by which the disks —1— and —2— and segment —3— are held against relative movement after which the operator grasps the extensions on the segments —4— and —5— at the point —B'— between the fingers of the right hand and moves said segments relatively to the segment —3— until the indicating edge —15— of the segment —4— is brought into registration with the graduation —20— opposite the head numeral —10—, said numerals 10 and 20 representing the dimensions of the exposed wall. This second adjustment further shifts the indicator arm —7— in the same direction around the concentric graduations on the reverse side of the disk —2—. There is now left the areas of the three windows 3 ft. by 6 ft. or what is the equivalent of one window 3 ft. by 18 ft. to be brought into the computation. This additional estimate is effected by shifting the position of the left hand to the point —C— for holding the disks —1— and —2— and segments —3— and —4— against relative movement after which the extension on the segment —5— is grasped at the point —C— by the fingers of the right hand and this segment is shifted until its indicating edge —47— is brought into registration with the graduation —18— on the concentric row of the segment —4— in line with the numeral 3 on the indicating edge of the segment —5—, the numeral 3 indicating the width of the window while the graduation —18— indicates the combined height of the three windows of 6 ft. each or 18 ft. Now by inverting the entire device bodily and holding the disks and segments in their adjusted positions it will be seen that the index finger —40— points to the numeral —80— which indicates the number of square ft. required for hot water heating and direct radiation while on the opposite side of the arm —7— the index finger —41— is registered with the numeral —50— and indicates the amount of radiating surface required for steam heating with direct radiation and in the same position the indicating fingers —42— and —43— are registered respectively with the numerals 160 and 80 indicating the amount of radiating surface required for water indirect and steam indirect radiation and in like manner the fingers —44— and —45— indicate the amount of radiating surface required for water and steam with "direct tapping". In like manner the amount of radiating surface for any room with any amount of exposed wall or glass surface may be readily ascertained. It is sometimes necessary after such computations to provide for additional radiating surface for extra exposed walls as roofs or outside door openings and under such conditions, the extra amount of radiating surface required may be computed by simply repeating some of the operations just described. For example, if in addition to the foregoing computations, it is desired to add further radiation for an exposed wall as a roof —10 by 20 feet, the disk —1— and segment —3— are grasped at the edges between the fingers of the left hand at the point —B— and held against relative movement whereupon the tongue or flap —9— is pressed by the fingers of the right hand at the point —D— Figs. 2 and 7 against the reverse side of the disk —2— with the thumb of the right hand still at the point —C'— whereupon the segments —4— and —5— are rocked to the left as far as their limiting stops will allow thereby moving the disk —2— in the same direction. Now by holding the disk and segment —3— with the left hand and grasping the edges of the segments —4— and —5— between the fingers of the right hand, the last two segments may be moved until the indicating edge —36— of the segment —4— is brought into registration with the graduation —20— of the concentric row headed by the numeral 10 on the segment —3— and by inverting the device and keeping the disks and segments in their adjusted positions the total amount of radiating surface required will be indicated by the index fingers on the arm —7— corresponding to the concentric rows of graduations on the disk —2—. In like manner the segment —5— may be readjusted for additional glass or door area.

What I claim is:

1. In a calculating device, a main body having circular rows of graduations numbered in sequence, and an additional circular row of graduations also numbered in sequence in multiples of the numbered graduations of the first named rows, a segmental disk pivoted to the main body having one edge thereof movable around and into registration with said graduations, an additional circular disk coaxial with said segment and bearing a concentric row of graduations numbered in sequence and correlated to the first named graduations, and an index finger pivoted at one end, extending across one face of the main body and having its other end bent upon itself and attached to said segment whereby said finger is actuated by the rotation of said segment around the graduations of the second circular disk whereby the movement of the segment to bring its radial edge into engagement with a certain graduation on the main body will cause the index finger to be moved into registration with a predetermined graduation on the second circular disk.

2. A calculating device for determining the radiating surface required to heat rooms of different sizes comprising a disk having a circular row of consecutively arranged numerals each indicating a particular number of square feet of radiating surface and an additional disk having concentric rows of numbered graduations each representing the floor area in square feet of a room of certain size, each of the latter rows of graduations bearing a number representing a particular height of room from floor to ceiling, a segmental disk movable about the center of the first named disks and one of its edges movable along the concentric rows of graduations, and an indicator revolving with said segmental disk around the row of graduations on the first named disk whereby when the edge of the segmental disk is registered with a predetermined graduation on one of the concentric rows the indicator revolving with the segmental disk will point to a certain graduation on the first named disk to indicate the number of square feet of radiating surface required.

3. A calculating device for determining the radiating surface required to heat rooms of different sizes comprising a disk having a circular row of consecutively arranged numerals each indicating a particular number of square feet of radiating surface, an additional disk having concentric rows of numbered graduations each representing the floor area in square feet of a room of certain size, each of the latter rows of graduations bearing a number representing a particular height of room from floor to ceiling, a segmental disk movable about the center of the first named disks and one of its edges movable along the concentric rows of graduations, an indicator revolving with said segmental disk around the rows of graduations on the first named disk whereby when the edge of the segmental disk is registered with a predetermined graduation on one of the concentric rows the indicator revolving with the segmental disk will point to a certain graduation on the first named disk to indicate the number of square feet of radiating surface required, and a table of numerals printed upon one of the disks and representing the areas in square feet of rooms of different lengths and widths.

4. A calculating device comprising a main body disk having concentric rows of graduations numbered consecutively from a predetermined starting point, each row being numbered at such starting point by a different numeral, the numerals of each graduation of each row representing the product of two predetermined numbers, a segmental disk revolving about the center of the concentric rows of graduations and having one edge thereof registerable with any one of such graduations, an additional disk having a circular row of graduations numbered consecutively from a predetermined starting point and concentric with the axis of the first named rows of graduations and each representing the products of the number of one of the first named graduations multiplied by the number of the row in which such graduation is located and an indicator revolving with the segmental disk and movable into registration with any one of the graduations in the circular row of said segmental disk.

In witness whereof I have hereunto set my hand this 2nd day of July 1908.

ARTHUR D. BURNETT.

Witnesses:
JOHN A. MAY,
H. RAY WILLIAMS.